E. G. BENDL.
CLUTCH.
APPLICATION FILED MAR. 21, 1919.
1,384,820.
Patented July 19, 1921.
4 SHEETS—SHEET 1.
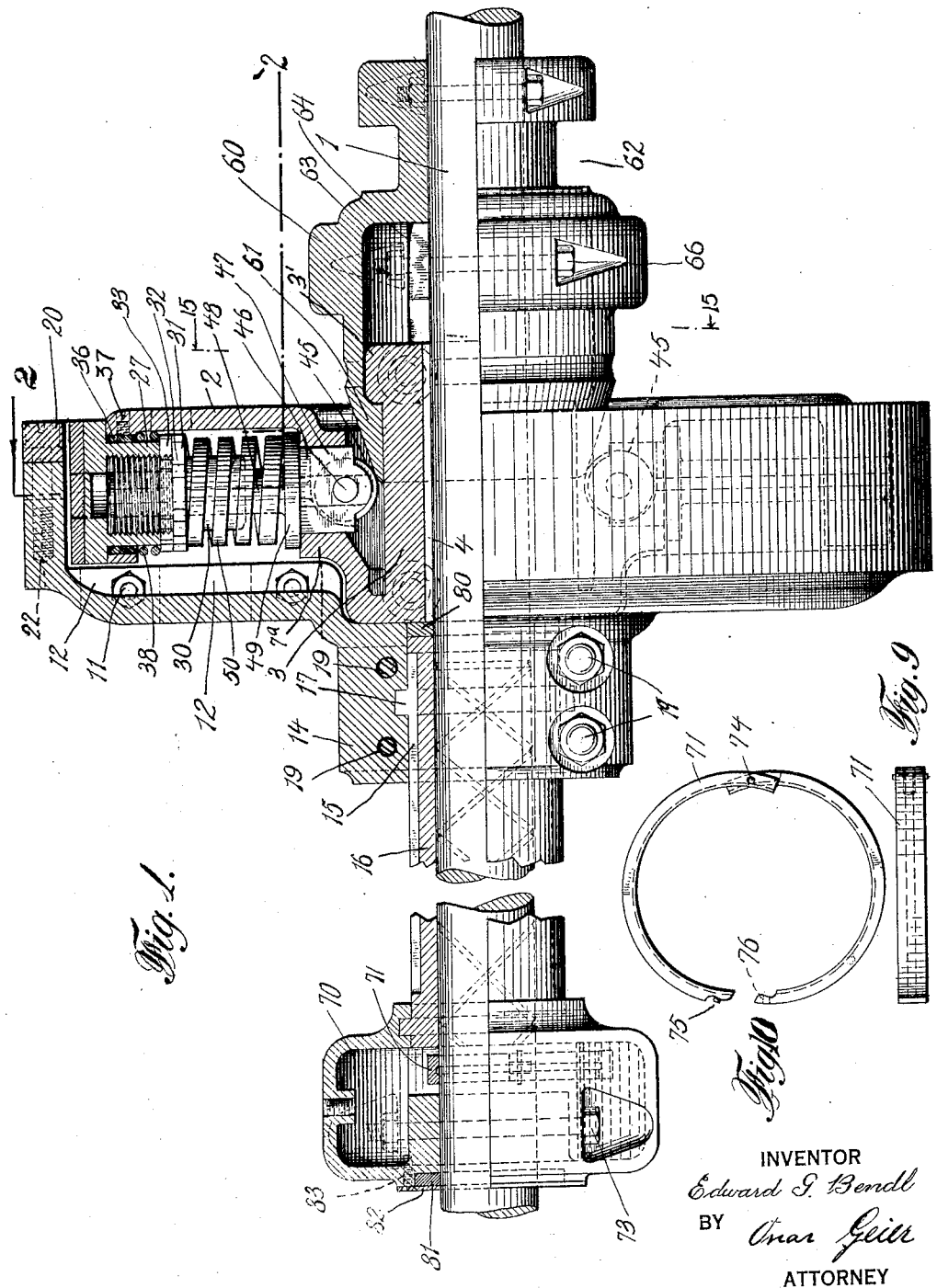
INVENTOR
Edward G. Bendl
BY Oscar Geier
ATTORNEY

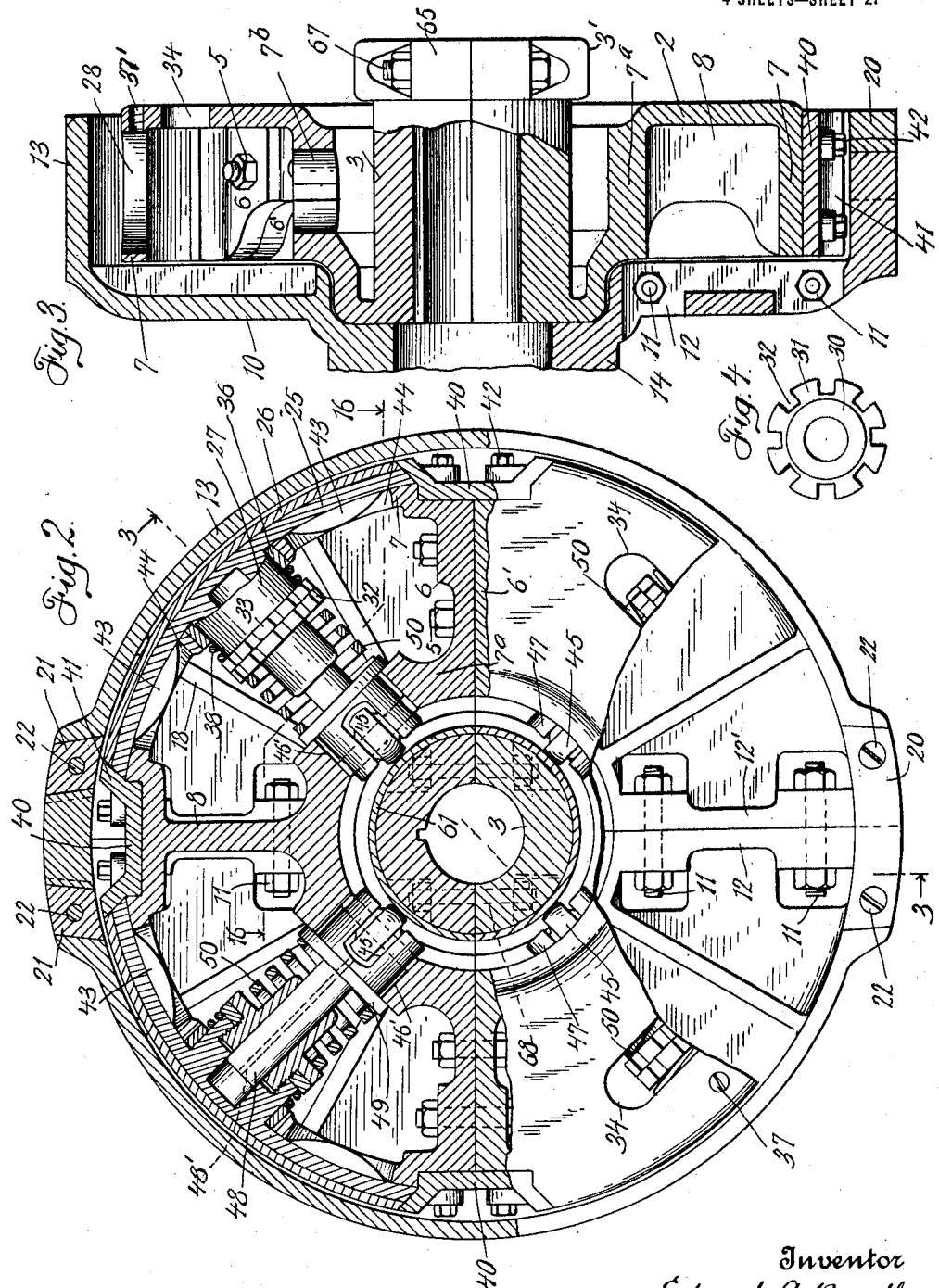

E. G. BENDL.
CLUTCH.
APPLICATION FILED MAR. 21, 1919.
1,384,820.
Patented July 19, 1921.
4 SHEETS—SHEET 3.
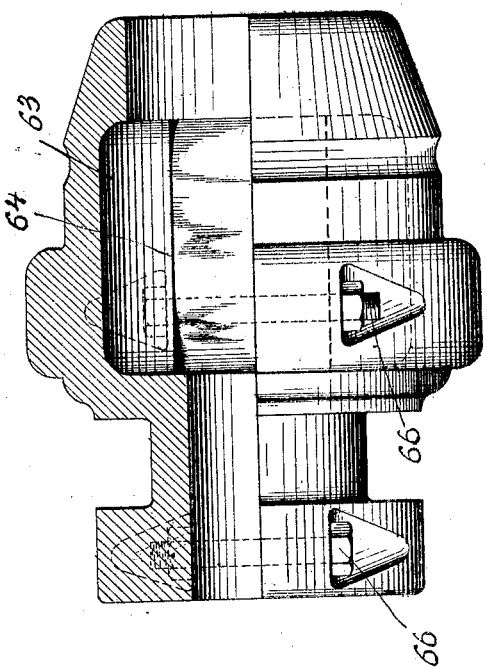
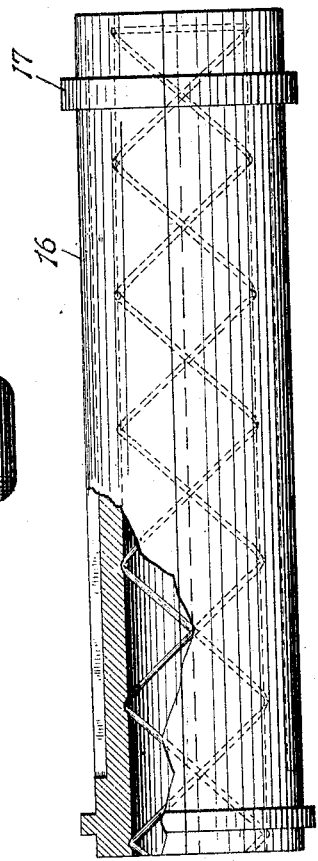
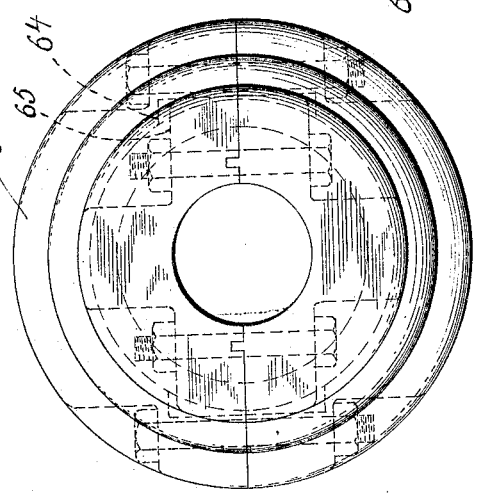
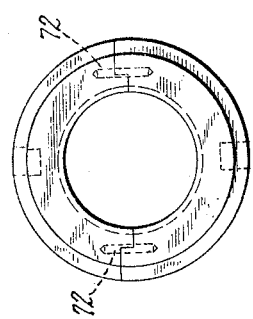
INVENTOR
Edward G. Bendl
BY
ATTORNEY

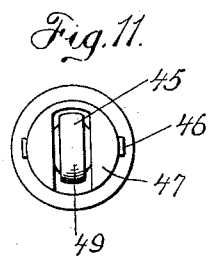
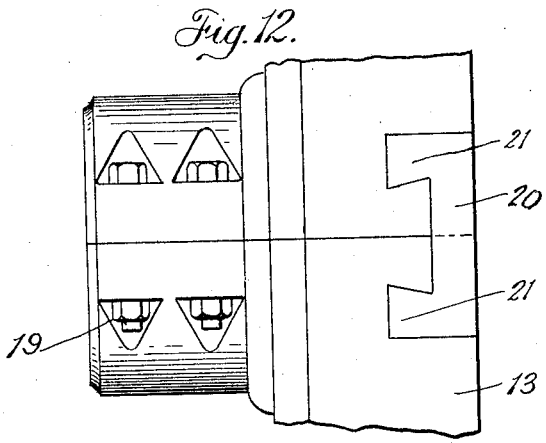
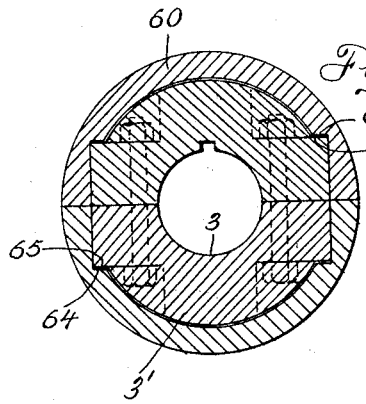
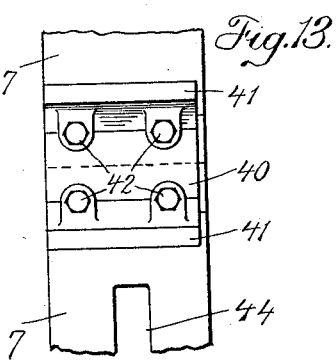
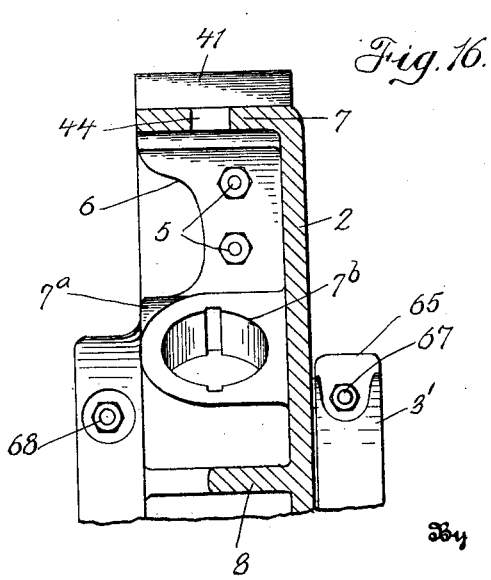
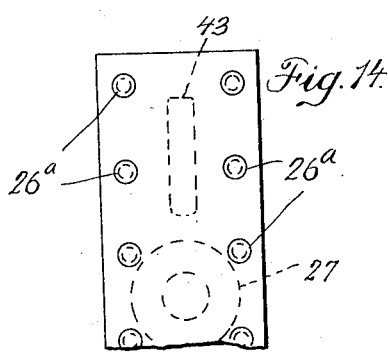

UNITED STATES PATENT OFFICE.

EDWARD GEORGE BENDL, OF BOGOTA, NEW JERSEY.

CLUTCH.

1,384,820.  Specification of Letters Patent.  Patented July 19, 1921.

Application filed March 21, 1919. Serial No. 284,053.

*To all whom it may concern:*

Be it known that I, EDWARD G. BENDL, a citizen of the United States, residing at Bogota, county of Bergen, and State of New Jersey, have invented certain new and useful Improvements in Clutches, of which the following is a specification.

This invention relates to clutches and it has for an object, broadly, to provide a clutch which may be easily applied to or removed from a shaft without removing the latter from its bearings, and further to provide a clutch whose various parts may be easily assembled and taken apart both with relation to each other and to the clutch as a whole.

A further object is to provide a novel arrangement and construction whereby an improved safety clutch is produced whose various shaft inclosing members are formed in sections permitting ready application to, or removal from, a shaft and which presents no projections to endanger a workman, or other person.

For further comprehension of the invention, and of the objects and advantages thereof, reference will be had to the following description and accompanying drawings, and to the appended claims in which the various novel features of the invention are more particularly set forth.

Figure 1 of the drawings is a part side elevation and part axial sectional view of a clutch constructed according to my invention.

Fig. 2 is a face view, partly in section on the line 2—2 of Fig. 1 with additional parts broken away to show the interior of the outer casing.

Fig. 3 is a vertical section on the line 3—3 of Fig. 2 with the operating parts removed.

Fig. 4 is a detail view showing the adjusting nut.

Fig. 5 is a detail view, partly in elevation and partly in axial section of the clutch cone.

Fig. 6 is end view thereof.

Fig. 7 is a side elevation, partly broken away, of the sleeve to which pulley is attached and is adapted to form the connection between the clutch and the pulley, or the like, to be driven by the shaft.

Fig. 8 is an end elevation of this sleeve.

Fig. 9 is a side elevation of the two-part oil ring.

Fig. 10 is a face view thereof.

Fig. 11 is an end view of the contact shoe operating roller and its carrying part.

Fig. 12 is a fragmentary side elevation of the main casing showing particularly the yoke engaging the two halves of the casing.

Fig. 13 is a fragmentary side elevation of the inner casing showing particularly the member which guides the contact shoes.

Fig. 14 is a fragmentary face view of one of the contact shoes.

Fig. 15 is a transverse section on the line 15—15 of Fig. 1.

Fig. 16 is a detail fragmentary section of the inner casing taken on the line 16—16 of Fig. 2.

My improved clutch, which I term a safety split clutch may be applied to any shaft which may be a part of a line of shafting, or may be directly connected to a motor or engine, or may be driven from any source of power.

As herein shown my improved clutch is of the type having an outwardly expanding shoe, or series of shoes adapted to engage the inner wall-surface of a suitable casing.

In the embodiment of the invention here shown I provide an inner casing 2, which is formed with a hub 3, inclosing the shaft 1, and keyed thereto as indicated at 4, this casing having mounted thereon the contact shoes as will be presently set forth. This casing is split into two semicircular halves, secured together by bolts 5 passing through the integral contacting webs 6 and 6' formed on the respective halves which are also provided with webs 8 extending at right angles thereto.

This casing has an exterior annular flange 7, which projects into a second casing 10 which is called the main casing of the clutch, and which is split into two halves secured together by bolts 11 passing through the ribs 12 and 12'. This casing has an outer annular flange 13 which incloses the flange 7, and a hub 14 keyed as at 15 to one end of a sleeve 16 loose upon the shaft 1. Longitudinal displacement of the sleeve is prevented by means of a projection 17 thereon which engages in a suitable groove in the hub 14. Supplementary ribs 18 serve to stiffen the outer casing. A pulley, gear, or other device to receive motion from the shaft 1, may be keyed upon the sleeve 16. Additional fastening bolts 19 extend through the halves of the hub 14. These casings 2 and 10 inclose the main compartment of the clutch.

To reinforce the bolts, in holding the two halves of the casing 10, I provide a pair of yokes which seat in the flange 13, at the junction of the two halves of the casing 10, these yokes each comprising a body 20 and prongs 21 having their inner faces inclined toward one another, while the end walls incline outwardly as shown, the flange 13 being cut out to form a complementary recess in which the yoke is received, the yoke being inserted from the inside of the casing, and being secured in place by screws 22 passing therethrough and screwing into the casing.

As previously stated the contact shoes are adapted to bear outwardly against the flange 13, of casing 10, and I provide four of these contact shoes which each comprise a segmental member 25 having fixed upon its surface, as by the rivets 26ª, a wear member 26. Each of the members 25 has an interiorly screw-threaded integral boss 27 formed midway of its length and projecting radially inwardly through a suitable opening 28 in the casing.

A sleeve 30 is screwed into this boss, this sleeve being formed midway of its length with a peripheral flange 31 having notches 32 cut therein to receive a spanner or the like. Between the flange 31 and the face of the boss 27 is a lock nut 33. By adjusting the sleeve 30 the shoe can be moved outward to compensate for wear or for any adjustment desired, the nut 33 locking against the face of the boss to hold the sleeve and shoe in adjusted positions. Openings 34 in the casing 2 are provided for access to the nut and sleeve for adjustment.

As shown most clearly in Fig. 1, the opening through which the boss 27 projects is larger than the boss and a bushing 36 is secured in the opening by a set screw 37, screwed in an opening 37' in the casing 2. Between this bushing 36 and the locknut 33, an expansile spring 38, which surrounds the boss 27, bears, this spring to move the contact shoe inwardly as will be apparent.

Plates 40, having flanges 41, may be fixed in suitable recesses in the flange 7 by screws 42, the flanges of these plates serving as guides for the ends of the contact shoes. The latter may be stiffened by ribs 43 formed on their inner sides and projecting through suitable slots 44 in the flange 7.

The contact shoe is forced outwardly by means of a cone, which engages a roller 45 loosely mounted on a pin 46 fixed in a circular head 47, which projects through a suitable boring 7ᵇ in an inner flange 7ª of the casing and is provided with a guiding stem 48, longitudinally perforated as at 48' which extends into the sleeve 30, and an enlargement 49 which seats against the flange 7ª. A heavy coiled spring 50 is disposed between the flange 31 and the enlargement 49 on the head 48 and transmits the outward movement of the head to the contact shoe. This spring 50 is proportioned so that it will not prevent the spring 38 from moving the contact shoe inwardly. To retain the roller 45 in alinement the pin 46 projects at its ends into suitable grooves 46' in the flange.

The cone for moving the rollers 45 outwardly comprises a hollow body or member 60 having a tapered forward end 61 which is adapted to slide over the hub 3 and under the rollers. The rear end of the member 60 has a peripheral groove 62 formed therein whereby it may be engaged by any of the usual clutch throw devices not necessary to be shown here.

The hub 3 has a flange 3' on its rear and which projects into a chamber 63 formed in the cone, this chamber and flange having squared coöperating grooves and projections 64 and 65 to prevent relative rotation. The cone is split diametrically as shown into two halves joined together by the bolts 66. Fastening bolts 67 and 68 pass through the flanged end 3' of the hub 3 and the forward end thereof.

As will be apparent from the drawings, these bolts 66 and their heads and nuts as well as the bolts securing the inner and outer casing halves together are all within the periphery of the parts through which they pass, so that danger of catching is eliminated.

The sleeve 16 may have fixed thereon, at the opposite end to that engaging the hub 14, an oil chamber 70 having therein an oil ring 71. As shown, the sleeve 16, oil chamber and ring 71 are each formed in two semi-circular halves. The two halves of the sleeve may be held in position by the bolts 73, while the two halves of the oil ring are hinged together as at 74, and provided with a pin 75 adapted to be sprung into opening 76. As will be apparent sleeves of different length may be used as desired with the same clutch casing. A felt washer 80 surrounds the shaft 1 between the end of the sleeve 16 and the hub 3 of the casing 2, while a second felt washer 81 is located in a suitable recess in the hub 70' of the oil chamber 70. This washer 81 is held in place by a plate 82 secured in place by screws 83.

As will be apparent from the above description, I have produced an improved clutch in which the features of safety and demountability are efficiently combined.

Having thus described my invention and set forth the manner of its construction, what I claim as new and desire to secure by Letters Patent is:—

1. A clutch comprising an outer casing, an inner casing, said casings inclosing the main clutch compartment between them and having oppositely projecting parallel adjacent flanges, said inner casing having an integral hub and a second flange spaced a short distance apart from the hub and surrounding the latter, a series of contact shoes carried by said inner casing, devices located in the said compartment mounted to move radially in said flanges of the inner casing to operate said shoes, and an element slidable on the said hub and adapted to engage and move said devices outwardly.

2. A clutch comprising an outer casing, an inner casing, said casings having parallel adjacent flanges, said inner casing having an integral hub and a second flange spaced a short distance apart from the hub and surrounding the latter, a series of contact shoes carried by said inner casing, devices mounted to move radially in said flanges of the inner casing to operate said shoes, a cone sleeve slidable on the said hub and adapted to engage and move said devices outwardly, said cone sleeve having an enlarged interior chamber, and a radial flange on the end of said hub projecting into said chamber, the periphery of said flange and the interior wall of said chamber having angular portions engaging each other whereby relative rotation is prevented.

3. In a clutch, an inner casing, a series of outwardly movable contact shoes carried by said casing, an outer casing against which said contact shoes are adapted to bear, said outer casing being diametrically split and formed on one face with a recess extending across the line of division, a yoke interlocking with the two halves of the casing to hold them together, said yoke and said recess each having its end walls converging toward one another in a radially outward direction whereby displacement of said yoke in a radially outward direction is prevented.

4. A clutch comprising an outer casing, and an inner casing, said casings having parallel adjacent flanges, a series of contact shoes carried by the inner casing and located in the space between the said flanges, said contact shoes having inwardly projecting hollow bosses, inwardly extending sleeves threaded into said hollow bosses, a member movable axially of the clutch, an element radially movable in the said inner casing adapted to be engaged and moved outwardly by the said member, said element having a stem projecting into the said sleeve, and a coiled spring surrounding said stem and transmitting motion from the said member to the said contact shoe, and resilient means adapted to move said shoe inwardly, said means comprising a second spring of less strength than the first spring coiled around and bearing against the said sleeve.

5. A clutch comprising an outer casing, and an inner casing, said casings having parallel adjacent flanges, a series of contact shoes carried by the inner casing and located in the space between the said flanges, said contact shoes having inwardly projecting bosses and the flange on the inner casing having openings of larger diameter than the said bosses to receive the latter, bushings removably secured in the said openings and surrounding the said bosses, inwardly extending flanged sleeves threaded into the said hollow bosses, release springs surrounding said bosses, and bearing between the flanges of the said sleeves and the said bushings, a member movable axially of the clutch, an element radially movable in the said inner casing adapted to be engaged and moved outwardly by the said member, said element having a stem projecting into the said sleeve, and a relatively strong coiled spring surrounding said stem and transmitting movement from the said element to the said contact shoe.

6. In a clutch, a casing provided with an opening, a radially movable contact shoe having a part extending through said opening, said opening being of larger diameter than the said part, means applied to said part for moving the contact shoe to apply the clutch, a bushing removably secured in the said opening, and a spring retained in operative position by said bushing adapted to move said contact shoe to release the clutch.

In testimony whereof I have affixed my signature.

EDWARD GEORGE BENDL.